US012284031B2

(12) United States Patent
Zhao et al.

(10) Patent No.: US 12,284,031 B2
(45) Date of Patent: Apr. 22, 2025

(54) DATA ENCODING METHOD, DATA DECODING METHOD, AND RELATED DEVICE

(71) Applicant: HUAWEI TECHNOLOGIES CO., LTD., Guangdong (CN)

(72) Inventors: Yijia Zhao, Chengdu (CN); Mo Li, Chengdu (CN); Zhiyu Xiao, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/452,555

(22) Filed: Aug. 20, 2023

(65) Prior Publication Data

US 2023/0403098 A1    Dec. 14, 2023

Related U.S. Application Data

(63) Continuation of application No. PCT/CN2022/076156, filed on Feb. 14, 2022.

(30) Foreign Application Priority Data

Feb. 26, 2021    (CN) .......................... 202110217065.1

(51) Int. Cl.
*H04L 1/18*    (2023.01)
*H04L 1/00*    (2006.01)

(52) U.S. Cl.
CPC .......... *H04L 1/0041* (2013.01); *H04L 1/0066* (2013.01)

(58) Field of Classification Search
CPC ... H04L 1/0057; H04L 1/0075; H04L 1/0066; H04L 1/0041
See application file for complete search history.

(56) References Cited

U.S. PATENT DOCUMENTS 7,065,696 B1 * 6/2006 Liu .................. H04L 1/0054
714/775
7,076,724 B2 * 7/2006 Cole ................ H04L 25/4908
714/784
(Continued)

FOREIGN PATENT DOCUMENTS

CN    101459490 A    6/2009
CN    111130686 A    5/2020
(Continued)

OTHER PUBLICATIONS

"Linear protection switching for transport MPLS (T-MPLS) networks",ITU-T, G.8131/Y.1382, Telecommunication Standardization Sector of ITU, (Feb. 2007), total 24 pages.
(Continued)

*Primary Examiner* — Esaw T Abraham

(57) ABSTRACT

Embodiments provide a data encoding method, a data decoding method, and a related device. The method includes a transmitting end device that determines N data symbols at a same symbol location of N links of service data, where N is an integer greater than 1, and quantities of bits in all data symbols are the same. The transmitting end device performs forward error correction (FEC) encoding on the N data symbols to obtain a codeword, where the codeword includes the N data symbols and M overhead symbols, M is an integer greater than or equal to 1 and less than or equal to N, and a quantity of bits in each data symbol is the same as a quantity of bits in each overhead symbol. The transmitting end device sends the N data symbols through N service channels, and sends the M overhead symbols through M overhead channels.

10 Claims, 7 Drawing Sheets

(56) References Cited

U.S. PATENT DOCUMENTS

| | | | |
|---|---|---|---|
| 7,174,096 B2 | 2/2007 | Berthold et al. | |
| 7,853,856 B2 * | 12/2010 | Vedantham | H03M 13/373 |
| | | | 370/473 |
| 9,258,164 B2 * | 2/2016 | Ko | H04H 20/71 |
| 9,923,666 B2 * | 3/2018 | Yang | H04L 1/0057 |
| 10,498,496 B2 * | 12/2019 | Lopez | H04L 1/1819 |
| 10,972,134 B2 * | 4/2021 | Strobel | H03M 13/2906 |

FOREIGN PATENT DOCUMENTS

| | | | |
|---|---|---|---|
| EP | 2645613 A2 | 10/2013 | |
| EP | 2654228 A2 | 10/2013 | |

OTHER PUBLICATIONS

Optical Internetworking Forum:"Very Short Reach (VSR) OC-192/STM-64 Interface Based on Parallel Optics", Implementation Agreement OIF-VSR4-01.0, VSR OC-192/STM-64 Interface, Dec. 18, 2000 (Dec. 18, 2000), XP002384661, total 22 pages.

* cited by examiner

| First link of service data | Symbol n | ... | Symbol 2 | Symbol 1 |
| Second link of service data | Symbol n | ... | Symbol 2 | Symbol 1 |

⋮

| $N^{th}$ link of service data | Symbol n | ... | Symbol 2 | Symbol 1 |

DATA ENCODING METHOD, DATA DECODING METHOD, AND RELATED DEVICE

CROSS-REFERENCE TO RELATED APPLICATIONS

This application is a continuation of International Application No. PCT/CN2022/076156 filed on Feb. 14, 2022, which claims priority to Chinese Patent Application No. 202110217065.1 filed on Feb. 26, 2021. The disclosures of the aforementioned applications are hereby incorporated by reference in their entireties.

TECHNICAL FIELD

This disclosure relates to the communication field, and in particular, to a data encoding method, a data decoding method, and a related device.

BACKGROUND

Optical fiber transmission network is the basis of a modern communication network, and reliable transmission of super-large capacity data carried on an optical network is the basic guarantee of reliability of the entire communication network. In an optical fiber transmission system, a sending module, a receiving module, and a channel include many components. An entire transmission link cannot work normally due to an unexpected fault of any component. This causes interruption of a service carried on the link.

Currently, an automatic protection switching solution is mainly used in an optical network transmission system, to be specific, one protection link is configured for each optical fiber link. When a fault occurs on a working link, one end immediately performs switching after detecting the fault, that is, switches from the working link to a protection link and notifies the other end to perform switching. After receiving a switching request, the other end immediately performs the switching, to ensure that a link is clear during communication. However, in a switching process, switching request instructions need to be sent end to end and hardware switching needs to be performed. In addition, there is detection time and hold-off time between occurrence of a fault and start of switching. An entire process lasts for a long time. Consequently, a large amount of data is lost during a fault period.

SUMMARY

Embodiments of this disclosure provide a data encoding method, a data decoding method, and a related device, to facilitate real-time recovery of faulty data, and avoid data loss caused by excessively long time for fault recovery.

According to a first aspect, an embodiment provides a data encoding method. The method includes a plurality of steps. First, a transmitting end device determines N data symbols at a same symbol location of N links of service data, where the N data symbols include one data symbol in each of the N links of service data. N is an integer greater than 1. Each of the N data symbols includes at least one bit, and quantities of bits included in all data symbols are the same. Then, the transmitting end device performs forward error correction (Forward Error Correction, FEC) encoding on the N data symbols, to obtain a codeword. The codeword includes the N data symbols and M overhead symbols, and M is an integer greater than or equal to 1 and less than or equal to N. A quantity of bits in each data symbol is the same as a quantity of bits in each overhead symbol, and the M overhead symbols are used to perform data recovery on a data symbol on which a transmission fault occurs in the N data symbols. Further, the transmitting end device separately sends the N data symbols through N service channels, and separately sends the M overhead symbols through M overhead channels.

In this implementation, the transmitting end device determines the N data symbols from the N links of service data at the same symbol location, and performs the FEC encoding on the N data symbols, to obtain the codeword. The codeword includes the original N data symbols and the M overhead symbols generated through the FEC encoding. The M overhead symbols are used to perform data recovery on the data symbol on which a transmission fault occurs in the N data symbols, to facilitate real-time recovery of faulty data, and avoid data loss caused by excessively long time for fault recovery.

In some possible implementations, before the determining N data symbols, the method further includes: The transmitting end device performs rate adaptation on the N links of service data, to enable transmission rates of the N links of service data to be the same. In the foregoing manner, it is ensured that a same quantity of bits can be extracted from each channel of service data in a same time period, so that a quantity of bits in each data symbol at a same symbol location is the same.

In some possible implementations, before the transmitting end device separately sends the N data symbols through the N service channels, and separately sends the M overhead symbols through the M overhead channels, the method further includes: The transmitting end device generates N synchronization symbols in a one-to-one correspondence with the N data symbols and M synchronization symbols in a one-to-one correspondence with the M overhead symbols. The transmitting end device may insert a synchronization symbol into each link of service data and each link of overhead data. Further, the transmitting end device separately sends the N synchronization symbols through the N service channels, and separately sends the M synchronization symbols through the M overhead channels, so that a receiving end device can synchronize symbols transmitted on a plurality of channels.

In some possible implementations, a value of M depends on a quantity of data symbols on which data recovery needs to be performed. That is, the value of M may be determined based on an actual requirement, to improve practicability of this solution. For example, to protect more data symbols, the value of M may be set to a larger value. For another example, to save resources consumed by the FEC encoding, the value of M may be set to a smaller value. Further, the transmitting end device selects a specific FEC encoding manner based on the value of M, to obtain different codewords.

In some possible implementations, that the transmitting end device performs FEC encoding on the N data symbols, to obtain a codeword includes: The transmitting end device performs the FEC encoding on the N data symbols by using maximum distance separable (Maximum Distance Separable, MDS) code, to obtain the codeword, which enhances implementability of the solution.

According to a second aspect, an embodiment provides a data decoding method. The method includes a plurality of steps. First, a receiving end device receives N data symbols through N service channels, and receives M overhead symbols through M overhead channels. N is an integer greater than 1, and M is an integer greater than or equal to 1 and less than or equal to N. Each data symbol includes at least one bit. A quantity of bits in each data symbol is the same as a quantity of bits in each overhead symbol. Then, the receiving end device performs FEC decoding based on the N data symbols and the M overhead symbols, to obtain the N data symbols obtained through the FEC decoding. The N data symbols include one data symbol at a same symbol location of each of N links of service data. The M overhead symbols are used to perform data recovery on a data symbol on which a transmission fault occurs in the N data symbols.

In this implementation, the receiving end device may perform the FEC decoding based on the received N data symbols and the received M overhead symbols, so that data recovery can be performed on the data symbol on which a transmission fault occurs in the N data symbols, to facilitate real-time recovery of faulty data, and avoid data loss caused by excessively long time for fault recovery.

In some possible implementations, before the receiving end device performs the FEC decoding based on the N data symbols and the M overhead symbols, to obtain the N data symbols obtained through the FEC decoding, the method further includes: The receiving end device calculates a syndrome of the N data symbols and the M overhead symbols. That the receiving end device performs FEC decoding based on the N data symbols and the M overhead symbols, to obtain the N data symbols obtained through the FEC decoding includes: The receiving end device performs the FEC decoding based on the syndrome, the N data symbols, and the M overhead symbols, to obtain the N data symbols obtained through the FEC decoding. In this implementation, this application provides the FEC decoding manner in which the receiving end device cannot determine a fault channel. To be specific, the receiving end device directly performs, based on the syndrome obtained through calculation, the error correction decoding on the received N data symbols and the received M overhead symbols, to obtain the N data symbols obtained through the FEC decoding, and improve practicability of this solution.

In some possible implementations, before the receiving end device performs the forward error correction FEC decoding based on the N data symbols and the M overhead symbols, to obtain the N data symbols obtained through the FEC decoding, the method further includes: The receiving end device determines a data symbol on which no transmission fault occurs in the N data symbols, and determines an overhead symbol on which no transmission fault occurs in the M overhead symbols. That the receiving end device performs FEC decoding based on the N data symbols and the M overhead symbols, to obtain the N data symbols obtained through the FEC decoding includes: The receiving end device performs the FEC decoding based on the data symbol on which no transmission fault occurs in the N data symbols and the overhead symbol on which no transmission fault occurs in the M overhead symbols, to obtain the N data symbols obtained through FEC decoding. In this implementation, this application provides a FEC decoding manner in which the receiving end device can determine a fault channel. To be specific, the receiving end device performs erasure decoding based on the data symbol on which no transmission fault occurs and the overhead symbol on which no transmission fault occurs, to obtain the N data symbols obtained through the FEC decoding, and improve scalability of this solution.

In some possible implementations, that the receiving end device determines a data symbol on which no transmission fault occurs in the N data symbols, and determines an overhead symbol on which no transmission fault occurs in the M overhead symbols includes: The receiving end device determines, through performing synchronization detection on the N data symbols, the data symbol on which no transmission fault occurs, and determines, through performing synchronization detection on the M overhead symbols, the overhead symbol on which no transmission fault occurs. In the foregoing manner, a synchronization detection manner may be used to determine a fault channel, to enhance implementability of this solution.

In some possible implementations, that the receiving end device determines a data symbol on which no transmission fault occurs in the N data symbols, and determines an overhead symbol on which no transmission fault occurs in the M overhead symbols includes: The receiving end device obtains channel fault detection information; and the receiving end device determines, based on the channel fault detection information, the data symbol on which no transmission fault occurs and the overhead symbol on which no transmission fault occurs. In the foregoing manner, the receiving end device may further directly read the fault detection information, to determine the fault channel, and improve flexibility of this solution.

In some possible implementations, a quantity of data symbols on which data recovery can be performed is less than or equal to M. In other words, because a quantity of overhead symbols is M, protection can be performed on a maximum of M data symbols.

According to a third aspect, an embodiment provides an encoder, and the encoder includes: an encoding unit, configured to determine N data symbols at a same symbol location of N links of service data, where the N data symbols include one data symbol in each of the N links of service data, N is an integer greater than 1, each of the N data symbols includes at least one bit, and quantities of bits included in all data symbols are the same, and configured to perform forward error correction FEC encoding on N data symbols, to obtain a codeword, where the codeword includes the N data symbols and M overhead symbols, M is an integer greater than or equal to 1 and less than or equal to N, a quantity of bits in each data symbol is the same as a quantity of bits in each overhead symbol, and the M overhead symbols are used to perform data recovery on a data symbol on which a transmission fault occurs in the N data symbols; and a sending unit, configured to separately send the N data symbols through N service channels, and separately send the M overhead symbols through M overhead channels.

In some possible implementations, the encoding unit is further configured to perform rate adaptation on the N links of service data, to enable transmission rates of the N links of service data to be the same.

In some possible implementations, the encoding unit is further configured to generate N synchronization symbols in a one-to-one correspondence with the N data symbols and M synchronization symbols in a one-to-one correspondence with the M overhead symbols. The sending unit is further configured to send the N synchronization symbols through the N service channels, and send the M synchronization symbols through the M overhead channels.

In some possible implementations, a value of M depends on a quantity of data symbols on which data recovery needs to be performed.

In some possible implementations, the encoding unit performs the FEC encoding on the N data symbols by using MDS code, to obtain the codeword.

According to a fourth aspect, an embodiment provides a decoder, where the decoder includes: a receiving unit, configured to: receive N data symbols through N service channels, and receive M overhead symbols through M overhead channels, where N is an integer greater than 1, M is an integer greater than or equal to 1 and less than or equal to N, each data symbol includes at least one bit, each overhead symbol includes at least one bit, and a quantity of bits in each data symbol is the same as a quantity of bits in each overhead symbol; and a decoding unit, configured to perform forward error correction FEC decoding based on the N data symbols and the M overhead symbols, to obtain the N data symbols obtained through the FEC decoding, where the N data symbols include one data symbol at a same symbol location of each of N links of service data, and the M overhead symbols are used to perform data recovery on a data symbol on which a transmission fault occurs in the N data symbols.

In some possible implementations, the decoding unit is configured to: calculate a syndrome of the N data symbols and the M overhead symbols, and perform the FEC decoding based on the syndrome, the N data symbols, and the M overhead symbols, to obtain the N data symbols obtained through the FEC decoding.

In some possible implementations, the decoding unit is configured to: determine a data symbol on which no transmission fault occurs in the N data symbols, and determine an overhead symbol on which no transmission fault occurs in the M overhead symbols, and perform the FEC decoding based on the data symbol on which no transmission fault occurs in the N data symbols and the overhead symbol on which no transmission fault occurs in the M overhead symbols, to obtain the N data symbols obtained through the FEC decoding.

In some possible implementations, the decoding unit is configured to: determine, through performing synchronization detection on the N data symbols, the data symbol on which no transmission fault occurs, and determine, through performing synchronization detection on the M overhead symbols, the overhead symbol on which no transmission fault occurs.

In some possible implementations, the decoding unit is configured to: obtain channel fault detection information, and determine, based on the channel fault detection information, the data symbol on which no transmission fault occurs and the overhead symbol on which no transmission fault occurs.

In some possible implementations, a quantity of data symbols on which data recovery can be performed is less than or equal to M.

According to a fifth aspect, an embodiment provides an encoder/decoder chip. The chip includes a logic circuit and/or program instructions. When the chip is run, the method in any one of the first aspect, the second aspect, or the implementations of the two aspects is implemented.

According to a sixth aspect, an embodiment provides a transmitting end device, where the transmitting end device includes the encoder in any implementation of the third aspect and a transmitter, and the encoder and the transmitter are interconnected through a line. The transmitter is configured to modulate an electrical signal output by the encoder into an optical signal, and send the optical signal to a receiving end device.

According to a seventh aspect, an embodiment provides a receiving end device, where the receiving end device includes the decoder in any implementation of the fourth aspect and a receiver, and the decoder and the receiver are interconnected through a line. The receiver is configured to demodulate an optical signal from a transmitting end device, to obtain an electrical signal, and transmit the electrical signal to the decoder.

According to an eighth aspect, an embodiment provides a communication system, including the transmitting end device shown in the sixth aspect and the receiving end device shown in the seventh aspect.

According to a ninth aspect, an embodiment provides a computer-readable storage medium, where the computer-readable storage medium stores a computer program; and when the computer program is executed by hardware, the computer program can implement some or all of the steps of any method in the first aspect or the second aspect.

This embodiment is applied to a multi-service data transmission scenario. A transmitting end device may extract one data symbol at a same symbol location of each link of service data, and perform FEC encoding on a plurality of extracted data symbols, to obtain a codeword. The codeword includes the original data symbol and an overhead symbol generated through the FEC encoding. The overhead symbol is used to perform data recovery on a data symbol on which a transmission fault occurs, to facilitate real-time recovery of faulty data, and avoid data loss caused by excessively long time for fault recovery.

DESCRIPTION OF EMBODIMENTS

Embodiments of this disclosure provide a data encoding method, a data decoding method, and a related device. A receiving end device may perform, based on M overhead symbols, data recovery on a data symbol on which a transmission fault may occur in N data symbols. Time required for the data recovery is short, to facilitate real-time recovery of faulty data, and avoid data loss caused by excessively long time for fault recovery.

It should be noted: The terms "first", "second", "third", and the like in the specification, claims, and accompanying drawings of this disclosure are used to distinguish similar objects, but do not limit a specific order or sequence. It should be understood that the foregoing terms may be interchanged in proper cases, so that embodiments described in this disclosure can be implemented in an order other than the content described in this disclosure. Furthermore, the terms "comprise" and "have" and any variations thereof are intended to cover non-exclusive inclusions. For example, a process, method, system, product, or device that includes a series of steps or units is not necessarily limited to those steps or units that are clearly listed, but may include other steps or units that are not clearly listed or are inherent to such processes, methods, products, or devices.

Figure 1:
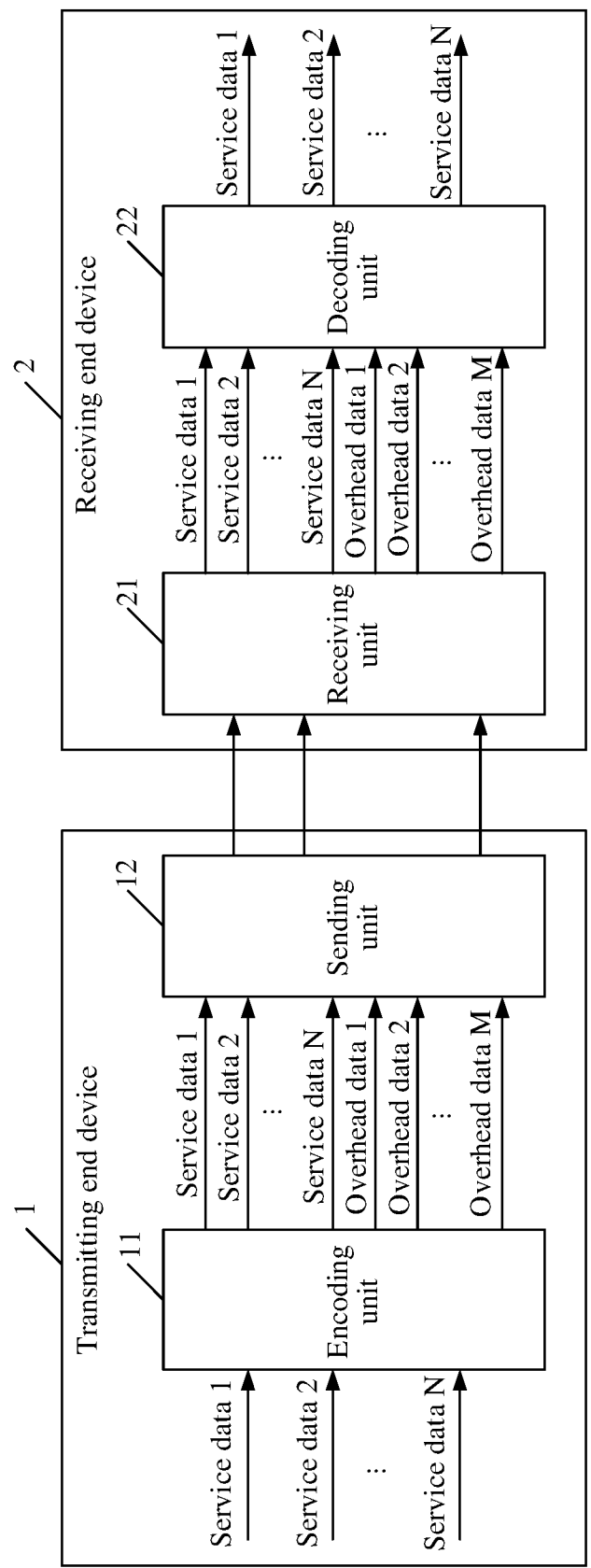
FIG. 1 is a schematic diagram of a structure of a communication system in accordance with this disclosure.

FIG. 1 is a schematic diagram of a structure of a communication system applied to this disclosure. The optical transmission system includes a transmitting end device 1 and a receiving end device 2. The transmitting end device 1 includes an encoding unit 11 and a sending unit 12. The receiving end device 2 includes a receiving unit 21 and a decoding unit 22. There are a plurality of data channels between the transmitting end device 1 and the receiving end device 2. In a possible implementation, the plurality of data channels may refer to a plurality of physical links, for example, a plurality of optical fibers. In another possible implementation, the plurality of data channels may alternatively be a plurality of wavelength signals in one optical fiber, where one wavelength signal is one data channel. It should be understood that one data channel may not strictly correspond to one specific wavelength, and the data channel may alternatively correspond to one band. This is not specifically limited herein.

Specifically, the encoding unit 11 may perform forward error correction (FEC) encoding on N links of service data, to obtain M links of overhead data. The sending unit 12 outputs (M+N) links of optical signals after performing an operation such as modulation on the N links of service data and the M links of overhead data. The (M+N) links of optical signals are transmitted to the receiving end device 2 through (M+N) data channels. The (N+M) data channels include N service channels for transmitting service data and M overhead channels for transmitting overhead data. After performing an operation such as demodulation on the (M+N) links of optical signals, the receiving unit 21 obtains the N links of service data and the M links of overhead data. Because a fault may occur on a part of the N service channels in the optical transmission system, a transmission fault of the service data may occur. In this case, the decoding unit 22 may perform, based on the M links of overhead data, data recovery on service data on which a transmission fault may occur in the N links of service data, so that the data on which a transmission fault occurs can be recovered.

It should be understood that the transmitting end device 1 and the receiving end device 2 are defined based on a data flow direction. The transmitting end device 1 may also include the foregoing receiving unit 21 and the foregoing decoding unit 22, to implement a function of the foregoing receiving end device 2. Similarly, the receiving end device 2 may also include the encoding unit 11 and the sending unit 12, to implement a function of the transmitting end device 1. In a possible implementation, the transmitting end device 1 and the receiving end device 2 may be an optical module or an optical transport network (Optical transport Network, OTN) device having an optical module. This is not specifically limited herein.

Figures 2, 3:
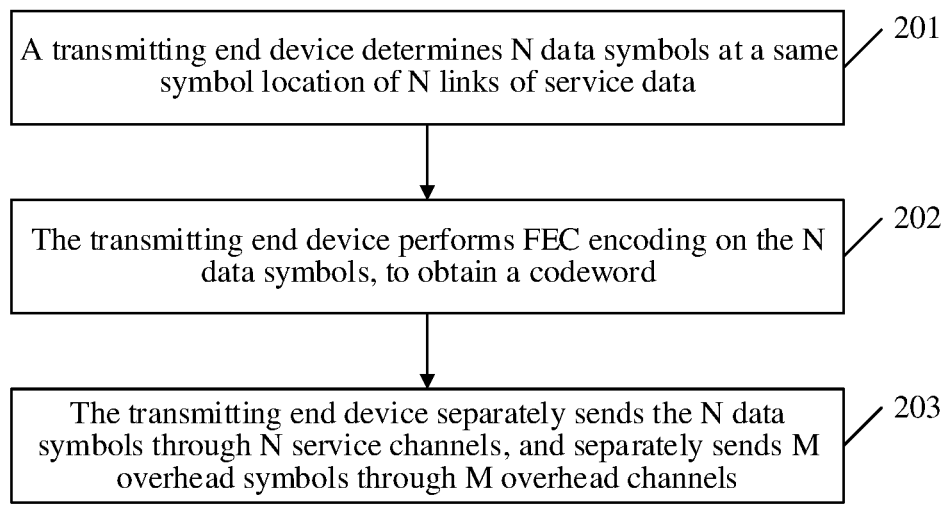
FIG. 2 is a schematic diagram of an embodiment of a data encoding method according to this disclosure.
FIG. 3 is a schematic diagram of dividing data symbols in each link of service data.

The following first describes in detail a data encoding method provided in this application. FIG. 2 is a schematic diagram of an embodiment of a data encoding method according to this application. In this example, the data encoding method includes the following steps.

201. A transmitting end device determines N data symbols at a same symbol location of N links of service data.

FIG. 3 is a schematic diagram of dividing data symbols in each of the N links of service data. As shown in FIG. 3, each link of service data may include one or more data symbols, and each data symbol includes at least one bit. For example, each link of service data may include a data symbol 1 to a data symbol n. Data symbols of each of the N links of service data at a same symbol location have a same quantity of bits. For example, symbols 1 at the 1$s$ t location in each link of service data have a same quantity of bits, symbols 2 at the 2$n$ d location in each link of service data have a same quantity of bits, and so on. In other words, a transmitting end device extracts the same quantity of bits at the same symbol location in each link of service data, to determine the N data symbols from the N links of service data. It should be understood that quantities of bits in data symbols at different symbol locations may be the same or different. For example, a quantity of bits in the symbol 1 may be the same as or different from a quantity of bits in the symbol 2. This is not specifically limited herein.

It should be noted: Each link of service data is transmitted at a respective transmission rate. A symbol extracted by the transmitting end device from each of the N links of service data at a same moment or in a same time period may be considered as a data symbol at a same symbol location of each of the N links of service data. In some possible implementations, transmission rates of the N links of service data may not be completely the same. To ensure that a same quantity of bits can be extracted from each link of service data in a same time period, rate adaptation needs to be performed on the N links of service data, so that the quantities of bits in all data symbols at the same symbol location are the same.

Figure 4:
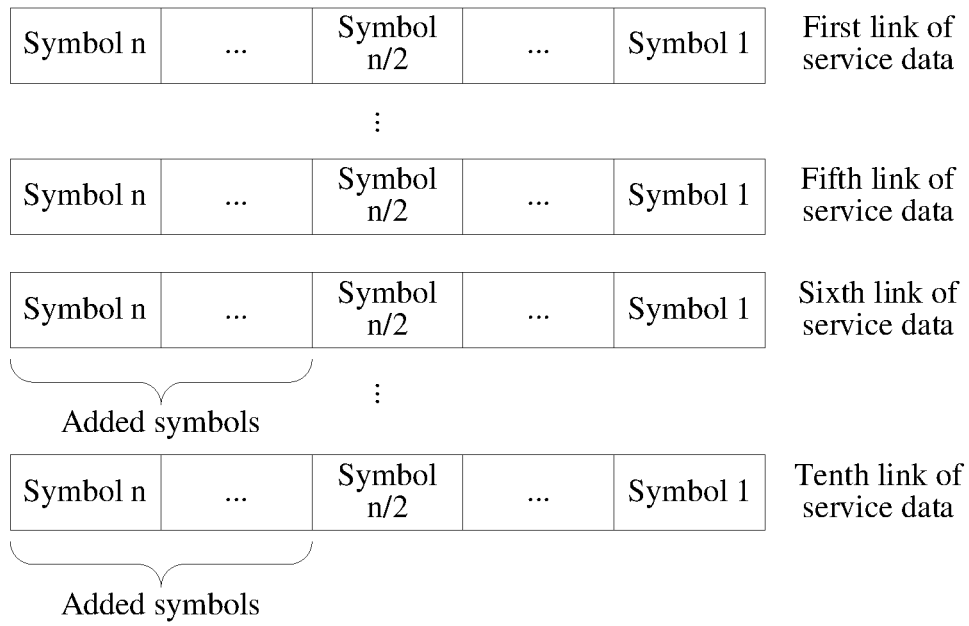
FIG. 4 is a schematic diagram of an embodiment in which rate adaptation is performed on each link of service data.

Specifically, the transmitting end device first determines target service data having a highest transmission rate in the N links of service data, and determines a quantity of data symbols in the target service data. Further, a specific quantity of data symbols is added to other service data having a low transmission rate, so that a quantity of data symbols included in the service data is the same as the quantity of data symbols in the target service data. Values of bits in the added data symbols may be the same, for example, the value is 0. It should be noted: The foregoing added data symbols are used only for rate adaptation, to perform FEC encoding on the N data symbols at the same symbol location, may be discarded after the FEC encoding ends, and are not transmitted through a system. Therefore, an original transmission link is not affected. FIG. 4 is a schematic diagram of an embodiment in which rate adaptation is performed on each link of service data. As shown in FIG. 4, transmission rates of first to fifth links of service data are consistent, transmission rates of sixth to tenth links of service data are consistent, and the transmission rates of the first to fifth links of service data are twice the transmission rates of the sixth to tenth links of service data. To be specific, a quantity of data symbols in each link of service data in the first to fifth links of service data is n, and a quantity of data symbols in each link of service data in the sixth to tenth links of service data is n/2. In this case, n/2 more data symbols may be separately added to the sixth to tenth links of service data, so that the transmission rates of the sixth to tenth links of service data are consistent with the transmission rates of the first to fifth links of service data.

202. The transmitting end device performs FEC encoding on the N data symbols, to obtain a codeword.

In this embodiment, the transmitting end device may perform the FEC encoding on the N data symbols at the same symbol location of the N links of service data, to obtain M overhead symbols. The M overhead symbols and the original N data symbols are included in the codeword. M is an integer greater than or equal to 1 and less than N. Each overhead symbol includes at least one bit, and a quantity of bits in each overhead symbol is the same as a quantity of bits in each data symbol. It should be noted: At a receiving end device, the M overhead symbols may be used to perform data recovery on a data symbol on which a transmission fault occurs in the N data symbols. Specifically, a value of M depends on a quantity of data symbols on which data recovery needs to be performed, and the quantity of data symbols on which the data recovery can be performed is less than or equal to M. That is, the value of M may be determined based on an actual requirement. For example, to protect more data symbols, the value of M may be set to a larger value. For another example, to save resources consumed by the FEC encoding, the value of M may be set to a smaller value. Further, the transmitting end device selects a specific FEC encoding manner based on the value of M, to obtain different codewords. It should be understood that a specific form of the used FEC encoding is not limited in this application. For example, the FEC encoding may be performed by using maximum distance separable (MDS) code.

Figure 5:
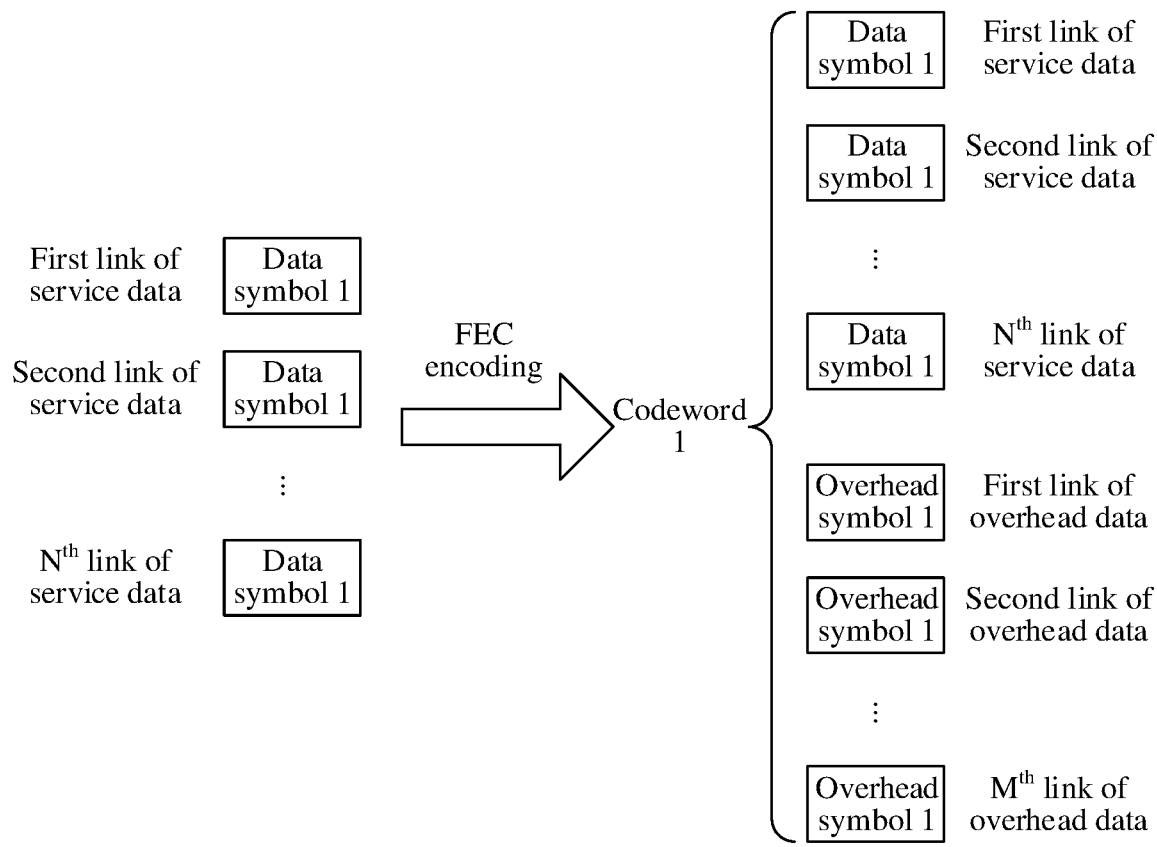
FIG. 5 is a schematic diagram of performing FEC encoding on N data symbols according to an embodiment of this disclosure.

FIG. 5 is a schematic diagram of performing the FEC encoding on the N data symbols according to an embodiment. As shown in FIG. 5, M overhead symbols 1 may be obtained through the FEC encoding on N data symbols 1 in the N links of service data, and the N data symbols 1 and the M overhead symbols 1 may be included in a codeword 1. Similarly, N data symbols at another symbol location may be encoded based on the foregoing FEC encoding manner, to obtain another codeword. For example, the FEC encoding is performed on N data symbols 2, to obtain a codeword 2 including N data symbols 2 and M overhead symbols 2.

It can be learned that the FEC encoding manner used in this application is different from a conventional FEC encoding manner. In conventional FEC encoding, one link of service data is encoded. FEC encoding of each link of service data is independent of each other. At the receiving end device, data recovery can be performed only on data that a transmission fault occurs in one link of service data. However, the FEC encoding manner used in this application is for a plurality of links of service data, and a plurality of data symbols at a same symbol location need to be extracted from each link of service data to perform the FEC encoding. The receiving end device may perform, based on the M overhead symbols, data recovery on a data symbol on which a transmission fault occurs in the N data symbols.

203. The transmitting end device separately sends the N data symbols through N service channels, and separately sends the M overhead symbols through M overhead channels.

Specifically, the transmitting end device separately modulates the N data symbols and the M overhead symbols, to obtain (M+N) links of optical signals, and then sends the (M+N) links of optical signals to the receiving end device through (M+N) channels. Specifically, the (M+N) channels include the N service channels and the M overhead channels. The N service channels are for transmitting optical signals corresponding to the N data symbols, and the M overhead channels are for transmitting optical signals corresponding to the M overhead symbols. It should be noted: The foregoing plurality of channels may refer to a plurality of physical links, for example, a plurality of optical fibers, or the foregoing channels may be a plurality of wavelength signals in one optical fiber. This is not specifically limited herein.

Figure 6:
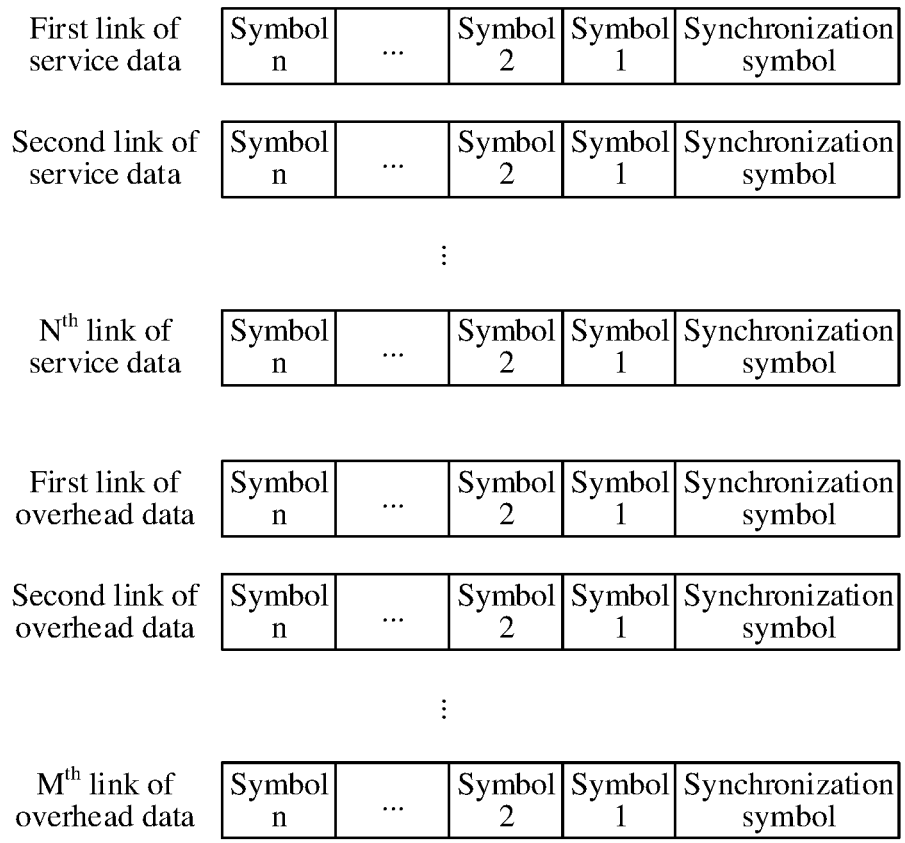
FIG. 6 is a schematic diagram of inserting synchronization symbols according to an embodiment of this disclosure.

In some possible implementations, to facilitate the receiving end device to synchronize symbols transmitted in the plurality of channels, the transmitting end device may insert a synchronization symbol into each link of service data and each link of overhead data. FIG. 6 is a schematic diagram of inserting synchronization symbols according to an embodiment of this application. As shown in FIG. 6, N symbols 1 in N links of service data and M symbols 1 in M links of overhead data are located at a same symbol location, synchronization symbols may be separately inserted at same locations after the N symbols 1 and the M symbols 1, and then modulation and output are performed. Therefore, after detecting the (N+M) synchronization symbols, the receiving end device may align the (N+M) symbols 1. It should be understood that, in addition to the synchronization manner described above, in actual application, another synchronization manner may also be used to synchronize the N data symbols and the M overhead symbols. This is not specifically limited herein.

It should be noted: The foregoing embodiment describes an implementation of performing FEC encoding on N data symbols at one symbol location. It should be understood that the transmitting end device continuously performs the FEC encoding on N data symbols at each symbol location, to complete the FEC encoding on the N links of service data. For a specific implementation, refer to the descriptions in the foregoing embodiment. Details are not described herein again.

Figure 7:
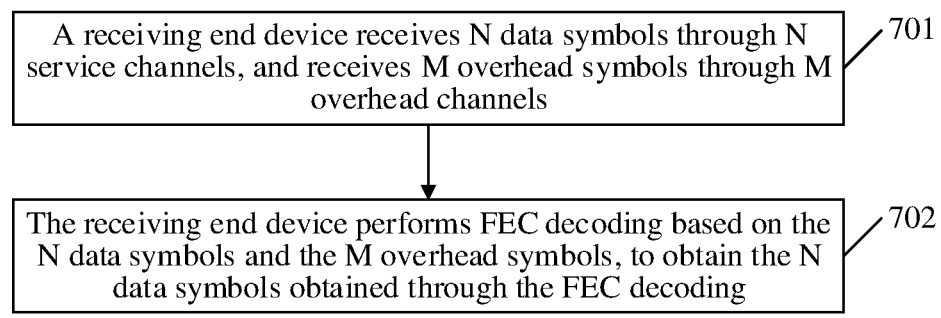
FIG. 7 is a schematic diagram of an embodiment of a data decoding method according to this disclosure.

The foregoing describes the data encoding method in embodiments, and the following describes in detail the data decoding method in embodiments of this application. FIG. 7 is a schematic diagram of an embodiment of a data decoding method according to this application. In this example, the data decoding method includes the following steps.

701. A receiving end device receives N data symbols through N service channels, and receives M overhead symbols through M overhead channels.

After demodulating received (N+M) links of optical signals, the receiving end device may obtain the N data symbols and the M overhead symbols. For descriptions of the data symbol and the overhead symbol, refer to related descriptions in the embodiment shown in FIG. 2. Details are not described herein again. It should be noted: If no transmission fault occurs on a channel between a transmitting end device and the receiving end device, the N data symbols received by the receiving end device are the same as N data symbols output by the transmitting end device. If a transmission fault occurs on the channel between the transmitting end device and the receiving end device, data symbols received through the fault channel include incorrect information, and the information is different from information included in original data symbols sent by the transmitting end device. In this case, data recovery needs to be performed on a data symbol on which a transmission fault occurs in the N data symbols by using the M overhead symbols. The following further describes the data recovery.

702. The receiving end device performs FEC decoding based on the N data symbols and the M overhead symbols, to obtain the N data symbols obtained through the FEC decoding.

In this embodiment, the receiving end device may obtain a codeword after performing the FEC decoding based on the N data symbols and the M overhead symbols, to perform data recovery on the data symbol on which a transmission fault occurs in the N data symbols. The codeword specifically includes the M overhead symbols and the N data symbols obtained through the FEC decoding. It should be understood that, after obtaining the codeword through the FEC decoding, the receiving end device may discard the M overhead symbols obtained through the FEC decoding, and then output the N data symbols obtained through the FEC decoding. The following describes several specific FEC decoding manners.

In a first manner, a FEC decoding manner used when the receiving end device can determine a fault channel: The receiving end device first determines a data symbol on which no transmission fault occurs in the N data symbols, and determines an overhead symbol on which no transmission fault occurs in the M overhead symbols. Further, the receiving end device performs erasure decoding based on the data symbols on which no transmission fault occurs and the overhead symbols on which no transmission fault occurs, to obtain the codeword. Specifically, the receiving end device may determine, in a plurality of manners, symbols (including the data symbol and the overhead symbol) on which no transmission fault occurs. For example, the receiving end device may determine, through obtaining channel fault detection information, a channel on which no fault occurs, and may determine that no transmission fault occurs on symbols transmitted on the channel. For another example, the receiving end device determines, through synchronization detection, whether a transmission fault occurs. If no synchronization symbol is detected, it indicates that a transmission fault occurs. If a synchronization symbol is detected, it indicates that no transmission fault occurs.

In a second manner, a FEC decoding manner used when the receiving end device cannot determine a fault channel. The receiving end device directly performs error correction decoding on the received N data symbols and the received M overhead symbols, to obtain the codeword. In a possible implementation, the receiving end device first calculates a syndrome (syndrome) of the N data symbols and the M overhead symbols, and then performs error correction decoding based on the syndrome, the N data symbols, and the M overhead symbols, to obtain the codeword. The syndrome may be specifically calculated in the following manner: $S=r*H^T$. S represents the syndrome, r represents the N data symbols and the M overhead symbols that are received by the receiving end device, H represents a check matrix of the codeword, and T represents matrix transpose. It should be noted: If the syndrome is 0, it indicates that no transmission fault occurs on the N data symbols and the M overhead symbols, and the receiving end device can directly output the N data symbols. If the syndrome is not 0, it indicates that a transmission fault occurs on at least one of the N data symbols and the M overhead symbols, and the receiving end device may perform FEC decoding, to perform data recovery on the data symbol on which a transmission fault may occur.

It should be noted: If the receiving end device can determine the fault channel, all the M overhead symbols may be used to perform data recovery on a data symbol on which a transmission fault occurs, and the data recovery may be performed on a maximum of M data symbols on which a transmission fault occurs. If the receiving end device cannot determine the fault channel, only a part of overhead symbols in the M overhead symbols may be used to perform data recovery on a data symbol on which a transmission fault occurs, and the data recovery can be performed only on less than M data symbols on which a transmission fault occurs.

The following further describes a processing procedure of the receiving end device by using several specific examples.

Example 1

Figure 8:
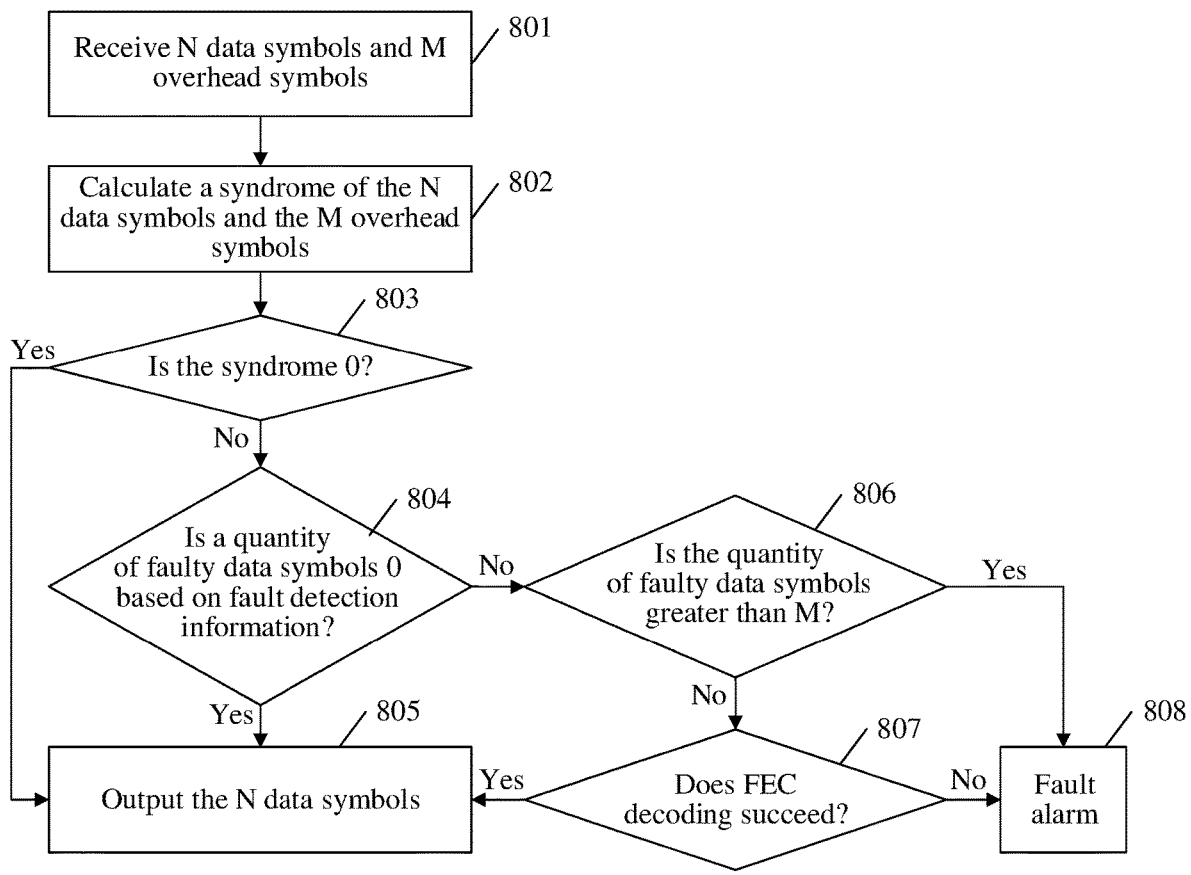
FIG. 8 is a schematic diagram of an embodiment of a processing procedure of a receiving end device according to this disclosure.

The receiving end device may read the fault detection information. FIG. 8 is a schematic diagram of an embodiment of a processing procedure of the receiving end device according to this application. In this example, the processing procedure of the receiving end device includes the following steps.

801. The receiving end device receives N data symbols and M overhead symbols.

Step 801 in this embodiment is similar to step 701 in the embodiment shown in FIG. 7. Details are not described herein again.

802. The receiving end device calculates a syndrome of the N data symbols and the M overhead symbols.

For details, refer to related descriptions about calculating the syndrome in step 702 in the embodiment shown in FIG. 7. Details are not described herein again.

803. The receiving end device determines whether the syndrome is 0. If yes, the receiving end device performs step 805; or if no, the receiving end device performs step 804.

804. The receiving end device determines, based on the fault detection information, whether a quantity of faulty data symbols is 0. If yes, the receiving end device performs step 805; or if no, the receiving end device performs step 806.

If the syndrome is not 0, it indicates that a transmission fault occurs on at least one of the N data symbols and the M overhead symbols. Further, the receiving end device may read the fault detection information, and determine, based on the fault detection information, whether the quantity of data symbols on which a transmission fault occurs is 0.

805. The receiving end device outputs the N data symbols.

If it is determined, according to step 803, that the syndrome is 0, it indicates that no transmission fault occurs on the N data symbols and the M overhead symbols, and the receiving end device can directly output the N data symbols. If it is determined, according to step 804, that the quantity of data symbols on which a transmission fault occurs is 0, it indicates that a transmission fault occurs on the overhead symbol, and the receiving end device can directly output the N data symbols. If it is determined, according to step 807, that FEC decoding succeeds, it indicates that data recovery has been performed on a data symbol on which a transmission fault occurs. In this case, the receiving end device may output the N data symbols obtained through the FEC decoding.

806. If the quantity of data symbols on which a transmission fault occurs is not 0, the receiving end device further determines whether the quantity of faulty data symbols is greater than M. If yes, the receiving end device performs step 808; or if no, the receiving end device performs step 807.

807. If the quantity of faulty data symbols is less than or equal to M, the receiving end device determines whether the FEC decoding succeeds. If yes, the receiving end device performs step 805; or if no, the receiving end device performs step 808.

In this embodiment, for a process of the FEC decoding, refer to related descriptions of step 702 in the embodiment shown in FIG. 7. Details are not described herein again.

808. The receiving end device raises a fault alarm.

In this embodiment, because a quantity of overhead symbols is M, the data recovery can be performed on only a maximum of M data symbols. Therefore, if it is determined, according to step 806, that the quantity of faulty data symbols is greater than M, the receiving end device raises the fault alarm. In addition, if it is determined, according to step 807, that the FEC decoding fails, the receiving end device also needs to raise the fault alarm.

Example 2

Figure 9:
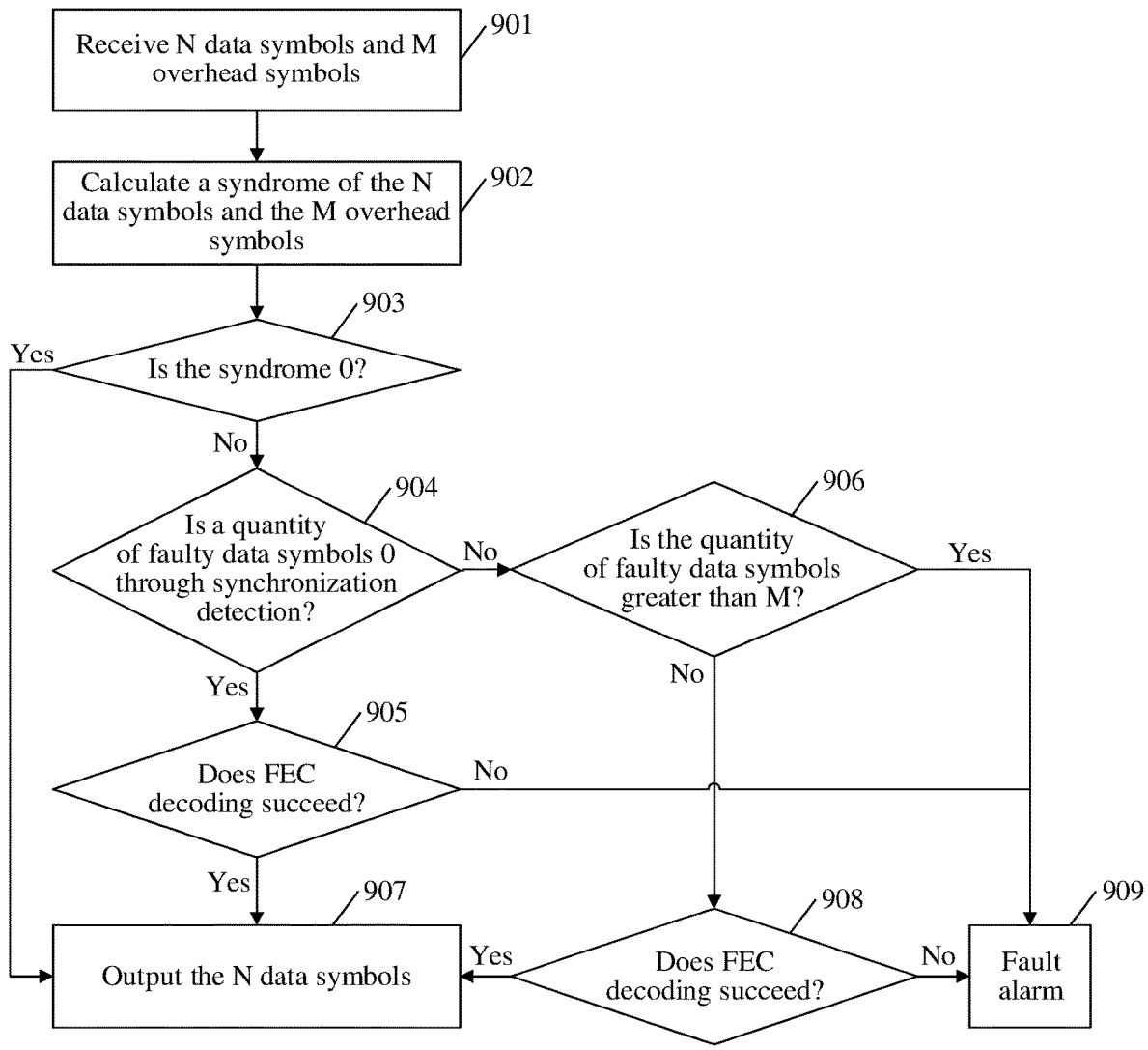
FIG. 9 is a schematic diagram of another embodiment of a processing procedure of a receiving end device according to this disclosure.

The receiving end device cannot read the fault detection information. FIG. 9 is a schematic diagram of another embodiment of a processing procedure of a receiving end device according to this application. In this example, the processing procedure of the receiving end device includes the following steps.

901. The receiving end device receives N data symbols and M overhead symbols.

Step 901 in this embodiment is similar to step 701 in the embodiment shown in FIG. 7. Details are not described herein again.

902. The receiving end device calculates a syndrome of the N data symbols and the M overhead symbols.

For details, refer to related descriptions about calculating the syndrome in step 702 in the embodiment shown in FIG. 7. Details are not described herein again.

903. The receiving end device determines whether the syndrome is 0. If yes, the receiving end device performs step 907; or if no, the receiving end device performs step 904.

904. The receiving end device determines, through synchronization detection, whether a quantity of faulty data symbols is 0. If yes, the receiving end device performs step 905, or if no, the receiving end device performs step 906.

If the syndrome is not 0, it indicates that a transmission fault occurs on at least one of the N data symbols and the M overhead symbols. Further, because the receiving end device cannot read the fault detection information, the receiving end device determines, through synchronization detection, whether the quantity of data symbols on which a transmission fault occurs is 0.

905. If it is determined, on the basis that the syndrome is not 0, through synchronization detection, that the quantity of faulty data symbols is 0, a determining result of the syndrome needs to be used, that is, it is still determined that at least one symbol on which transmission fault occurs and a fault location is unknown. Further, the receiving end device needs to determine whether FEC decoding succeeds. If yes, the receiving end device performs step 907, or if no, the receiving end device performs step 909.

In this embodiment, for a process of the FEC decoding, refer to related descriptions of step 702 in the embodiment shown in FIG. 7. Details are not described herein again.

906. If it is determined, through synchronization detection, that the quantity of faulty data symbols is not 0, the receiving end device further determines whether the quantity of faulty data symbols is greater than M. If yes, the receiving end device performs step 909, or if no, the receiving end device performs step 908.

907. The receiving end device outputs the N data symbols.

If it is determined, according to step 903, that the syndrome is 0, it indicates that no transmission fault occurs on the N data symbols and the M overhead symbols, and the receiving end device can directly output the N data symbols. If it is determined, according to step 905 or step 908, that the FEC decoding succeeds, it indicates that data recovery has been performed on a data symbol on which a transmission fault occurs. In this case, the receiving end device may output the N data symbols obtained through the FEC decoding.

908. If the quantity of faulty data symbols is less than or equal to M, the receiving end device determines whether the FEC decoding succeeds. If yes, the receiving end device performs step 907; or if no, the receiving end device performs step 909.

In this embodiment, for a process of the FEC decoding, refer to related descriptions of step 702 in the embodiment shown in FIG. 7. Details are not described herein again.

909. The receiving end device raises a fault alarm.

Because a quantity of overhead symbols is M, the data recovery can be performed on only a maximum of M data symbols. Therefore, if it is determined, according to step 906, that the quantity of faulty data symbols is greater than M, the receiving end device raises the fault alarm. In addition, if it is determined, according to step 905 or step 908, that the FEC decoding fails, the receiving end device also needs to raise the fault alarm.

In embodiments of this application, the transmitting end device determines the N data symbols from the N links of service data at a same symbol location, and performs the FEC encoding on the N data symbols, to obtain the codeword. The codeword includes the original N data symbols and the M overhead symbols generated through the FEC encoding. The M overhead symbols are used to perform data recovery on a data symbol on which a transmission fault occurs in the N data symbols. Compared with a conventional solution in which normal communication is ensured through protection link switching, a data encoding manner and a data decoding manner provided in this application are used, so that time required for data recovery is short, to facilitate real-time recovery, of faulty data, and avoid data loss caused by excessively long time for fault recovery.

The following describes an encoder and a decoder provided in this application.

Figure 10:
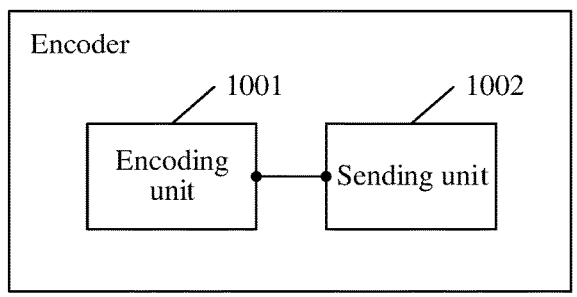
FIG. 10 is a schematic diagram of a structure of a possible encoder according to an embodiment of this disclosure.

FIG. 10 is a schematic diagram of a structure of a possible encoder according to an embodiment of this disclosure. As shown in FIG. 10, the encoder includes an encoding unit 1001 and a sending unit 1002. Specifically, the encoding unit 1001 is configured to perform operations in step 201 and step 202 in the embodiment shown in FIG. 2. The sending unit 1002 is configured to perform an operation in step 203 in the embodiment shown in FIG. 2.

Figure 11:
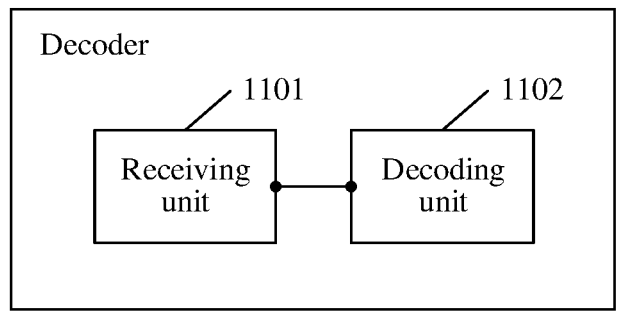
FIG. 11 is a schematic diagram of a structure of a possible decoder according to an embodiment of this disclosure.

FIG. 11 is a schematic diagram of a structure of a possible decoder according to an embodiment of this application. As shown in FIG. 11, the decoder includes a receiving unit 1101 and a decoding unit 1102. Specifically, the receiving unit 1101 is configured to perform an operation in step 701 in the embodiment shown in FIG. 7. The decoding unit 1102 is configured to perform an operation in step 702 in the embodiment shown in FIG. 7.

Figure 12:
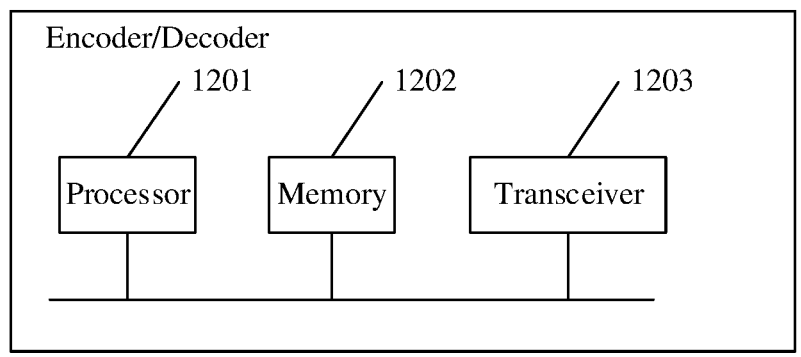
FIG. 12 is a schematic diagram of a structure of a possible encoder/decoder according to an embodiment of this disclosure.

FIG. 12 is a schematic diagram of a structure of another possible encoder/decoder according to an embodiment. As shown in FIG. 12, the encoder/decoder includes a processor 1201, a memory 1202, and a transceiver 1203. The processor 1201, the memory 1202, and the transceiver 1203 are interconnected through a line. The memory 1202 is configured to store program instructions and data. In a possible implementation, the transceiver 1203 is configured to perform a data sending and receiving operation in the step shown in FIG. 2. The processor 1201 is configured to perform other operations except data sending and receiving in the step shown in FIG. 2. The processor 1201 may include the encoding unit 1001 shown in FIG. 10, and the transceiver 1203 may include the sending unit 1002 shown in FIG. 10. In another possible implementation, the transceiver 1203 is configured to perform a data sending and receiving operation in the step shown in FIG. 7. The processor 1201 is configured to perform other operations except data sending and receiving in the step shown in FIG. 7. The processor 1201 may include the decoding unit 1102 shown in FIG. 11, and the transceiver 1203 may include the receiving unit 1101 shown in FIG. 11.

It should be noted: The processor shown in FIG. 12 may use a general-purpose central processing unit (CPU), a general-purpose processor, a digital signal processor (DSP), an application-specific integrated circuit (ASIC), a field programmable gate array (FPGA), or another programmable logic device, a transistor logic device, a hardware component, or any combination thereof. The memory shown in FIG. 12 may store an operating system and another application program. When the technical solutions provided in embodiments of this application are implemented by using software or firmware, program code used to implement the technical solutions provided in embodiments of this application is stored in the memory, and is executed by the processor. In an embodiment, the processor may include the memory inside. In another embodiment, the processor and the memory are two independent structures.

The following describes the transmitting end device and the receiving end device provided in this application.

Figure 13:
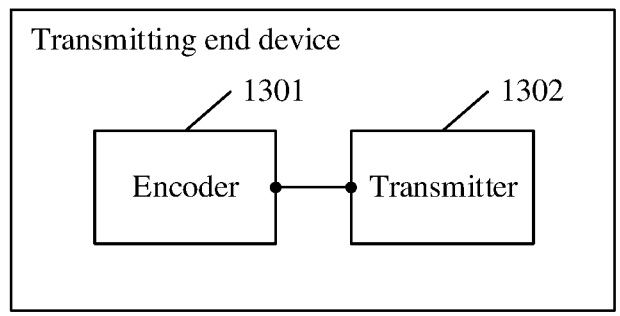
FIG. 13 is a schematic diagram of a structure of a possible transmitting end device according to this disclosure.

FIG. 13 is a schematic diagram of a structure of a possible transmitting end device according to this disclosure. As shown in FIG. 13, the transmitting end device includes an encoder 1301 and a transmitter 1302. The encoder 1301 and the transmitter 1302 are interconnected through a line. The encoder 1301 may be specifically the encoder shown in FIG. 10. The transmitter 1302 is configured to: modulate an electrical signal output by the encoder 1301 into an optical signal, and send the optical signal to a receiving end device.

Figure 14:
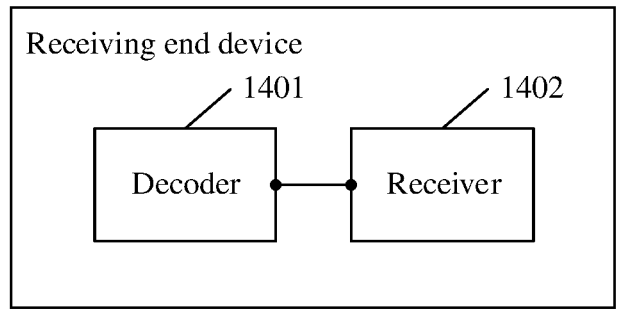
FIG. 14 is a schematic diagram of a structure of a possible receiving end device according to this disclosure.

FIG. 14 is a schematic diagram of a structure of a possible receiving end device according to this disclosure. As shown in FIG. 14, the receiving end device includes a decoder 1401 and a receiver 1402. The decoder 1401 and the receiver 1402 are interconnected through a line. The decoder 1401 may be specifically the decoder shown in FIG. 11. The receiver 1402 is configured to demodulate an optical signal from a transmitting end device to obtain an electrical signal, and transmit the electrical signal to the decoder 1401.

This disclosure further provides an encoding chip. The chip includes a logic circuit and/or program instructions. When the chip is run, some or all steps of any method in the embodiment shown in FIG. 2 are implemented.

This disclosure further provides a decoding chip. The chip includes a logic circuit and/or program instructions. When the chip is run, some or all steps of any method in the embodiment shown in FIG. 7 are implemented.

It may be clearly understood by a person skilled in the art that, for convenient and brief description, for a detailed working process of the foregoing system, apparatus, and unit, refer to a corresponding process in the foregoing method embodiments. Details are not described herein again.

A person of ordinary skill in the art may understand that all or some of the steps of the embodiments may be implemented by hardware or a program instructing related hardware. The program may be stored in a computer-readable storage medium. The storage medium may include a read-only memory, a random access memory, or the like. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

When software is used to implement the embodiments, the method steps in the foregoing embodiments may be implemented completely or partially in a form of a computer program product. The computer program product includes one or more computer instructions. When the computer program instructions are loaded and executed on a computer, the procedures or functions according to embodiments of this disclosure are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semi-conductor medium (for example, a solid-state drive (SSD)), or the like.

Finally, it should be noted that the foregoing descriptions are merely specific implementations and are not intended to limit the protection scope of this disclosure. Any variation or replacement readily determined by a person skilled in the art within the technical scope of this disclosure shall fall within the protection scope of the accompanying claims.

What is claimed is:

1. A data encoding method, comprising:
    determining, by a transmitting end device, N data symbols at a same symbol location of N links of service data, wherein the N data symbols comprise one data symbol in each of the N links of service data, N is an integer greater than 1, each of the N data symbols comprises at least one bit, and quantities of bits comprised in all data symbols are the same;
    performing, by the transmitting end device, forward error correction (FEC) encoding on the N data symbols to obtain a codeword, wherein the codeword comprises the N data symbols and M overhead symbols, M is an integer greater than or equal to 1 and less than or equal to N, a quantity of bits in each data symbol is the same as a quantity of bits in each overhead symbol, and the M overhead symbols are configured to perform data recovery on a data symbol on which a transmission fault occurs in the N data symbols; and
    separately sending, by the transmitting end device, the N data symbols through N service channels, and separately sending the M overhead symbols through M overhead channels.

2. The method according to claim 1, further comprising:
performing, by the transmitting end device, rate adaptation on the N links of service data to enable transmission rates of the N links of service data to be the same.

3. The method according to claim 1, further comprising:
generating, by the transmitting end device, N synchronization symbols in a one-to-one correspondence with the N data symbols and generating M synchronization symbols in a one-to-one correspondence with the M overhead symbols; and
separately sending, by the transmitting end device, the N synchronization symbols through the N service channels, and separately sending the M synchronization symbols through the M overhead channels.

4. The method according to claim 1, wherein a value of M is related to a quantity of data symbols on which data recovery is to be performed.

5. The method according to claim 1, wherein the performing, FEC encoding on the N data symbols comprises:
performing, by the transmitting end device, the FEC encoding on the N data symbols by using maximum distance separable (MDS) code to obtain the codeword.

6. An encoder, comprising:
an encoding unit, configured to determine N data symbols at a same symbol location of N links of service data, wherein the N data symbols comprise one data symbol in each of the N links of service data, N is an integer greater than 1, each of the N data symbols comprises at least one bit, and quantities of bits included in all data symbols are the same, and
perform forward error correction (FEC) encoding on the N data symbols to obtain a codeword, wherein the codeword comprises the N data symbols and M overhead symbols, M is an integer greater than or equal to 1 and less than or equal to N, a quantity of bits in each data symbol is the same as a quantity of bits in each overhead symbol, and the M overhead symbols are configured to perform data recovery on a data symbol on which a transmission fault occurs in the N data symbols; and
a sending unit, configured to separately send the N data symbols through N service channels, and to separately send the M overhead symbols through M overhead channels.

7. The encoder according to claim 6, wherein the encoding unit is further configured to:
perform rate adaptation on the N links of service data to enable transmission rates of the N links of service data to be the same.

8. The encoder according to claim 6, wherein the encoding unit is further configured to:
generate N synchronization symbols in a one-to-one correspondence with the N data symbols and M synchronization symbols in a one-to-one correspondence with the M overhead symbols; and
the sending unit is further configured to:
separately send the N synchronization symbols through the N service channels and to separately send the M synchronization symbols through the M overhead channels.

9. The encoder according to claim 6, wherein a value of M is related to a quantity of data symbols on which data recovery is to be performed.

10. The encoder according to claim 6, wherein the encoding unit is configured to:
perform the FEC encoding on the N data symbols by using maximum distance separable (MDS) code to obtain the codeword.

* * * * *